United States Patent [19]

Strub

[11] Patent Number: 4,520,915

[45] Date of Patent: Jun. 4, 1985

[54] MULTISTAGE CLUTCH DISC ARRANGEMENT WITH DISHED CLUTCH DISC, FRICTION GENERATING MEANS, AND LOAD FRICTION UNIT

[75] Inventor: Jean-Claude Strub, Strassburg-Neuhof, France

[73] Assignee: Luk Lamellen und Kupplungsbau GmbH, Bühl, Fed. Rep. of Germany

[21] Appl. No.: 396,137

[22] Filed: Jul. 7, 1982

[30] Foreign Application Priority Data

Jul. 7, 1981 [DE] Fed. Rep. of Germany ....... 3126695

[51] Int. Cl.³ .......................... F16D 3/14; F16D 3/66
[52] U.S. Cl. ............................ 192/106.2; 192/70.17; 464/68
[58] Field of Search .................... 192/106.2, 70.17; 464/68, 66, 81

[56] References Cited

U.S. PATENT DOCUMENTS

| 3,817,362 | 6/1974 | Rist ........................ 192/106.2 X |
| 3,863,747 | 2/1975 | Werner et al. ............... 192/106.2 |
| 3,931,876 | 1/1976 | Beeskow et al. ............. 192/106.2 |
| 4,018,320 | 4/1977 | Schrape ..................... 464/68 X |
| 4,036,341 | 7/1977 | Beeskow et al. ............. 192/106.2 |
| 4,044,873 | 8/1977 | Parsons et al. .............. 192/106.2 |
| 4,122,931 | 10/1978 | Maucher ..................... 192/106.2 |
| 4,285,423 | 8/1981 | Fädler et al. ............... 192/106.2 |
| 4,381,052 | 4/1983 | Maucher ..................... 192/106.2 |

FOREIGN PATENT DOCUMENTS

| 97542 | 7/1980 | Japan ...................... 192/106.2 |
| 97543 | 7/1980 | Japan ...................... 192/106.2 |
| 1200013 | 7/1970 | United Kingdom ............. 192/106.2 |
| 1196811 | 7/1970 | United Kingdom ............. 192/106.2 |
| 1592007 | 7/1981 | United Kingdom . | |

Primary Examiner—Rodney H. Bonck
Assistant Examiner—David D. House
Attorney, Agent, or Firm—Peter K. Kontler

[57] ABSTRACT

A clutch disc arrangement for use in friction clutches of automotive vehicles has a hub which carries two ring-shaped guides flanking a ring-shaped partition secured to a radially extending flange of the hub. A clutch disc, which carries the friction coatings, is installed between one of the guides and the partition, together with a first friction generating unit cooperating with one or more coil springs acting between the guides and the clutch disc to oppose rotation of the clutch disc from a neutral angular position relative to the hub. A friction disc and a second friction generating unit are installed between the partition and the other guide, and the friction disc cooperates with additional coil springs, acting between the friction disc and one or both guides, to oppose certain advanced stages of rotation of the clutch disc relative to the hub. The second friction generating unit has a friction pad between the friction disc and the partition, and the first friction generating unit has a split ring which is surrounded by the inner marginal portion of the clutch disc and surrounds a distancing ring of the hub and abuts against the partition.

27 Claims, 5 Drawing Figures

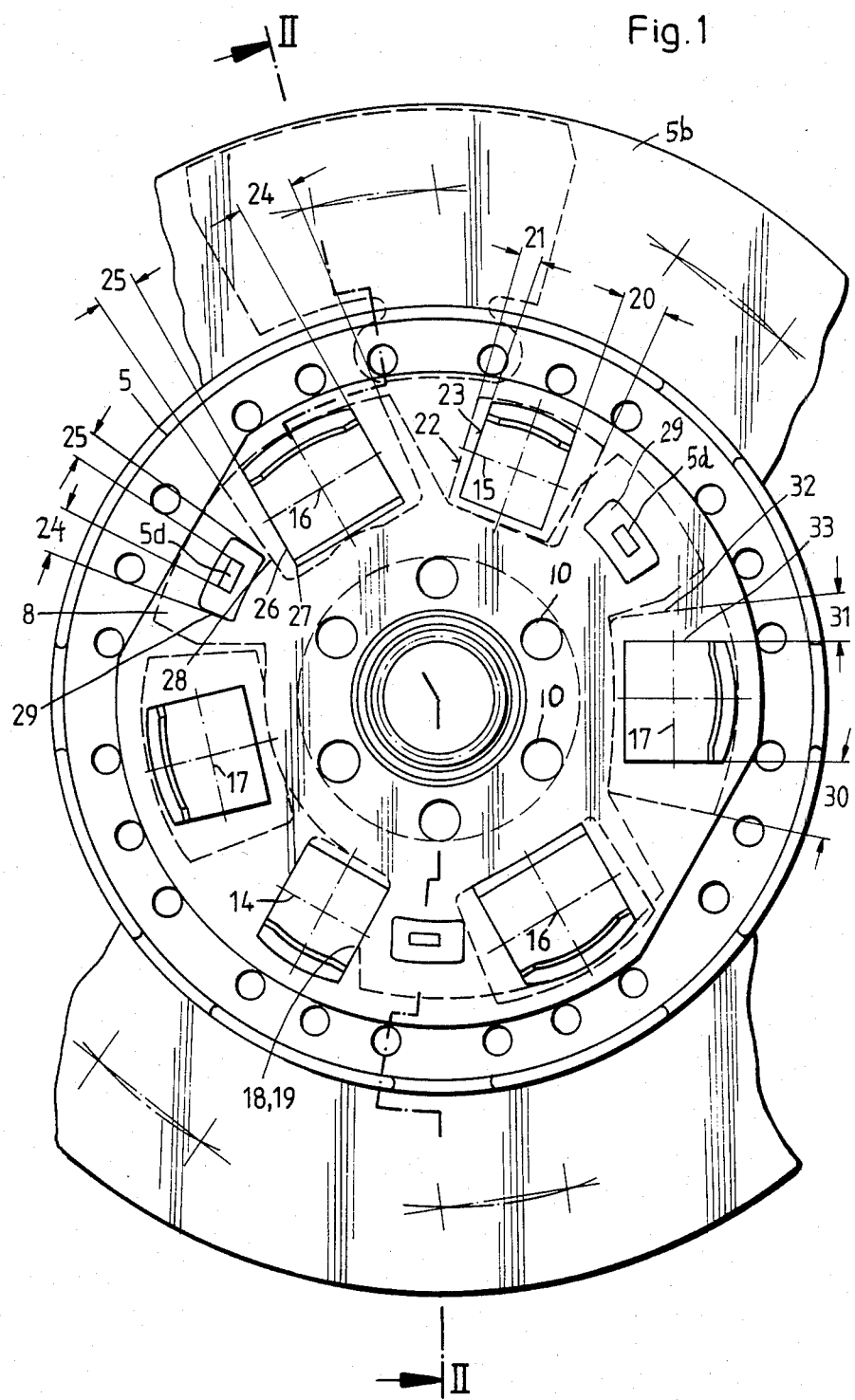

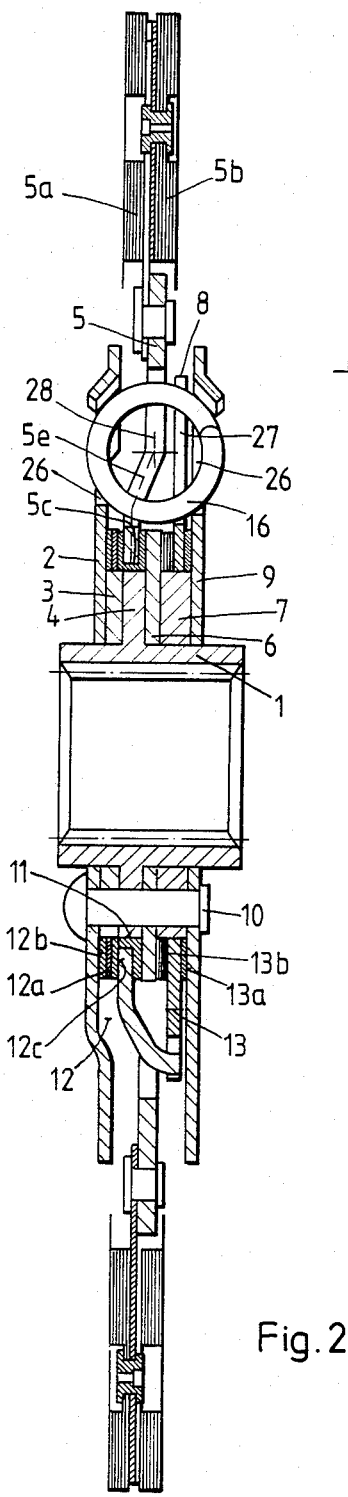
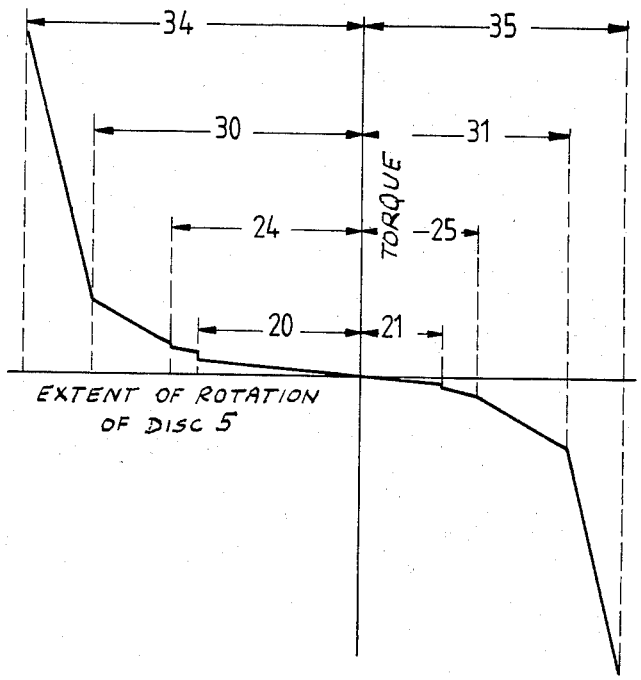
Fig. 4
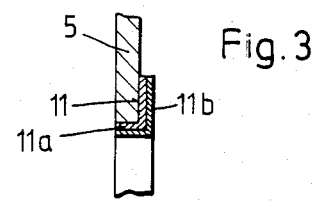
Fig. 3
Fig. 2

MULTISTAGE CLUTCH DISC ARRANGEMENT WITH DISHED CLUTCH DISC, FRICTION GENERATING MEANS, AND LOAD FRICTION UNIT

CROSS-REFERENCE TO RELATED CASE

The clutch disc arrangement of the present invention includes certain parts which are somewhat similar to certain parts disclosed in the commonly owned copending U.S. patent application Ser. No. 394,830 filed July 2, 1982 by Paul Maucher for "Clutch Disc Arrangement".

BACKGROUND OF THE INVENTION

The present invention relates to clutches in general, and more particularly to improvements in clutch disc arrangements which can be utilized with advantage in friction clutches of automotive vehicles.

A clutch disc arrangement normally comprises a hub which is connected for rotation with two lateral disc-shaped annular guides flanking the radially innermost portion of a clutch disc which carries the customary friction coatings and is rotatable, within limits, relative to the hub. It is also known to provide energy storing devices in the form of coil springs or the like which oppose at least some stages of angular movement of the clutch disc relative to the hub and/or vice versa. For the sake of simplicity, the following description will speak of rotation of the clutch disc relative to the hub with the understanding, however, that the situation is analogous when the hub turns relative to the clutch disc, when the clutch disc and the hub turn in opposite directions or when the hub and the clutch disc turn in the same direction but at different speeds. As a rule, the energy storing devices are mounted between the clutch disc and the guides of the hub. Furthermore, it is already known to install between the clutch disc and the component including the hub and the guides one or more friction generating units which also oppose rotation of the clutch disc relative to the hub. Still further, it is already known to provide such clutch disc arrangements with a so-called load friction unit which is active or effective only after the clutch disc has already completed a certain amount of angular displacement in a clockwise or counterclockwise direction from a neutral angular position with reference to the hub. A conventional load friction unit can comprise at least one friction disc which is installed between the clutch disc and one of the guides as well as a friction generating device (e.g., a friction pad). Still further, the load friction unit can comprise, or it can be associated with, one or more energy storing devices (e.g., additional coil springs) which are interposed between the guides and the friction disc to yieldably oppose at least some stages of angular movement of the friction disc relative to the hub. Reference may be had, for example, to FIGS. 5 and 6 of commonly owned German Pat. No. 24 36 288 granted Oct. 6, 1977. The clutch disc arrangements which are shown in FIGS. 5 and 6 of this German patent employ a clutch disc and two friction discs between the guides on the hub or a single friction disc, a clutch disc at one side of the single friction disc and a further disc which is disposed at the other side of the friction disc and is rigidly connected to the clutch disc. It has been found that the assembly of such clutch disc arrangements is a relatively complex and time-consuming operation, and also that the dimensions of the patented arrangement, as considered in the axial direction of the hub, may not be ideal for use in certain types of friction clutches.

OBJECTS AND SUMMARY OF THE INVENTION

An object of the invention is to provide a novel and improved clutch disc arrangement which is simpler, more compact and less expensive than heretofore known clutch disc arrangements.

Another object of the invention is to provide a clutch disc arrangement whose versatility exceeds that of heretofore known clutch disc arrangements and which can offer predictable resistance to rotation of the clutch disc relative to the hub during each of several stages of angular movement of the clutch disc relative to the hub.

A further object of the invention is to provide a clutch disc arrangement which can be assembled or taken apart in a time saving operation and by resort to relatively simple tools.

An additional object of the invention is to provide a clutch disc arrangement whose space requirements, as considered in the axial direction of the hub, are less than those of heretofore known arrangements.

Still another object of the invention is to provide a novel and improved distribution of energy storing elements and friction generating means which oppose rotation of the clutch disc from a neutral angular position with reference to the hub.

A further object of the invention is to provide a novel and improved method of arraying the various constituents of a clutch disc arrangement which embodies the aforeoutlined features.

An ancillary object of the invention is to provide a novel and improved clutch disc for use in an arrangement of the above outlined character.

A feature of the invention resides in the provision of a clutch disc arrangement, particularly for use in friction clutches of automotive vehicles, e.g., to transmit torque between the crankshaft of an engine and the input element of a change-speed transmission. The improved clutch disc arrangement comprises a first component whose parts rotate as a unit and which includes a hub, a pair of spaced apart guides (e.g., in the form of annular collars or flanges surrounding the hub) and a partition which surrounds the hub (e.g., in the space between the two guides). The improved arrangement further comprises a second component including a clutch disc which is disposed between the two guides and is rotatable within limits relative to the first component from a neutral angular position (preferably in a clockwise as well as in a counterclockwise direction), first energy storing means interposed between the two components to yieldably resist rotation of the clutch disc from its neutral position (such energy storing means can comprise several sets of coil springs which are installed in windows provided therefor in the clutch disc and in at least one of the guides), at least one first friction generating means interposed between the two components and operative to resist at least some stages of rotation of the clutch disc from its neutral position, and a load friction unit which is interposed between the two components and serves to resist predetermined advanced stages of rotation of the clutch disc from its neutral position (i.e., the load friction unit becomes effective only after the clutch disc has already completed a certain angular movement from its neutral position). The load friction unit comprises at least one friction disc between the clutch disc and one of the guides, at least one second friction generating means interposed between the friction disc and the first component, and second energy storing means (e.g., one or more additional coil springs) interposed between the friction disc and the first component to oppose rotation of the clutch disc relative to the first component during a predetermined (advanced) stage of rotation of the clutch disc from its neutral position. The clutch disc and the first friction generating means are disposed at one side, and the friction disc and the second friction generating means are disposed at the other side of the partition, as considered in the axial direction of the hub. The guides and the partition are preferably rigid with the hub, and the second energy storing means is preferably operative between the friction disc and at least one of the guides.

The second energy storing means is preferably installed (e.g., in the friction disc and in one or both guides) outwardly of the partition, as considered in the radial direction of the hub. Thus, the partition can be relatively short, as considered in the radial direction of the hub. The annular member which constitutes or forms part of the partition can have a maximum diameter which is merely a small fraction of the maximum diameter of the clutch disc (and of the friction coatings which are carried by the clutch disc) and is less than the maximum diameters of the guides and friction disc.

The partition can be integral with the hub, or it can constitute a separately machined washer-like body which is non-rotatably secured to the hub, preferably to a radially outwardly extending annular flange of the hub.

Each of the discs preferably constitutes an annulus, and the first component preferably further comprises first and second carriers (e.g., in the form of distancing rings surrounding the hub and being rotatable therewith). The first carrier is surrounded by the clutch disc and preferably also by one or more parts of the first friction generating means, and the second carrier is surrounded by the friction disc and preferably by one or more parts of the second friction generating means. The carriers are disposed between the two guides, and the aforementioned flange of the hub can be adjacent to the first carrier so that it is also surrounded by the clutch disc and/or by one or more parts of the first friction generating means.

At least one of the two discs (e.g., the clutch disc) can be provided with one or more projections in the form of arms which are integral with the clutch disc and extend toward the friction disc in parallelism with the axis of the hub so as to overlie at least one of the friction generating means and the partition. The construction may be such that the projection or projections of the one disc engage with the other disc in response to angular displacement of the clutch disc from its neutral position. The other disc is preferably provided with a cutout receiving the projection of the one disc with at least some clearance, as considered in the circumferential direction of the hub, so that the clutch disc must rotate through a predetermined angle from its neutral position before the projection of the one disc engages with the surface bounding the cutout of the other disc to thus compel the friction disc to share further angular movements of the clutch disc from its neutral position. In other words, the friction unit is ineffective as long as the clutch disc can turn relative to the friction disc due to the fact that the projection of the one disc is received with clearance in the cutout of the other disc.

The first friction generating means can comprise a first portion which is interposed between the clutch disc and the flange of the first component, and a second portion which is interposed between the first portion and the flange. Each such portion can have a substantially L-shaped cross-sectional outline and then includes a first leg disposed between the flange and the clutch disc and a second leg disposed between the clutch disc and the partition. The first portion can consist of steel, and the second portion can consist of a material having a relatively high coefficient of friction. The two portions of the first friction generating means can be said to constitute a composite liner whose strata are interposed in part between the clutch disc and the first carrier and in part between the clutch disc and the partition. The liner can resemble or constitute a split ring so that it can be inserted into the central opening of the clutch disc. The inner marginal portion of the clutch disc can be dished so that it can readily confine or overlie (as considered in the radial direction of the hub) not only the partition but also the aforementioned flange of the hub.

As considered in the axial direction of the hub, one of the guides is preferably outwardly adjacent to the clutch disc which is adjacent to one side of the partition whose other side is adjacent to the friction disc which, in turn, is inwardly adjacent to the other guide. The first friction generating means is preferably disposed between the partition and the one guide, and the second friction generating means can be disposed between the partition and the other guide.

The novel features which are considered as characteristic of the invention are set forth in particular in the appended claims. The improved clutch disc arrangement itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary elevational view of a clutch disc arrangement which embodies the present invention, with certain constituents of the arrangement partly broken away;

FIG. 2 is a sectional view substantially as seen in the direction of arrows from the line II—II of FIG. 1;

FIG. 3 is an enlarged view of a detail in the structure of FIG. 2;

FIG. 4 is a diagram showing the relationship between torque and the angular displacement of the clutch disc to both sides of its neutral position.

DESCRIPTION OF THE PREFERRED EMBODIMENTS

Figure 5:
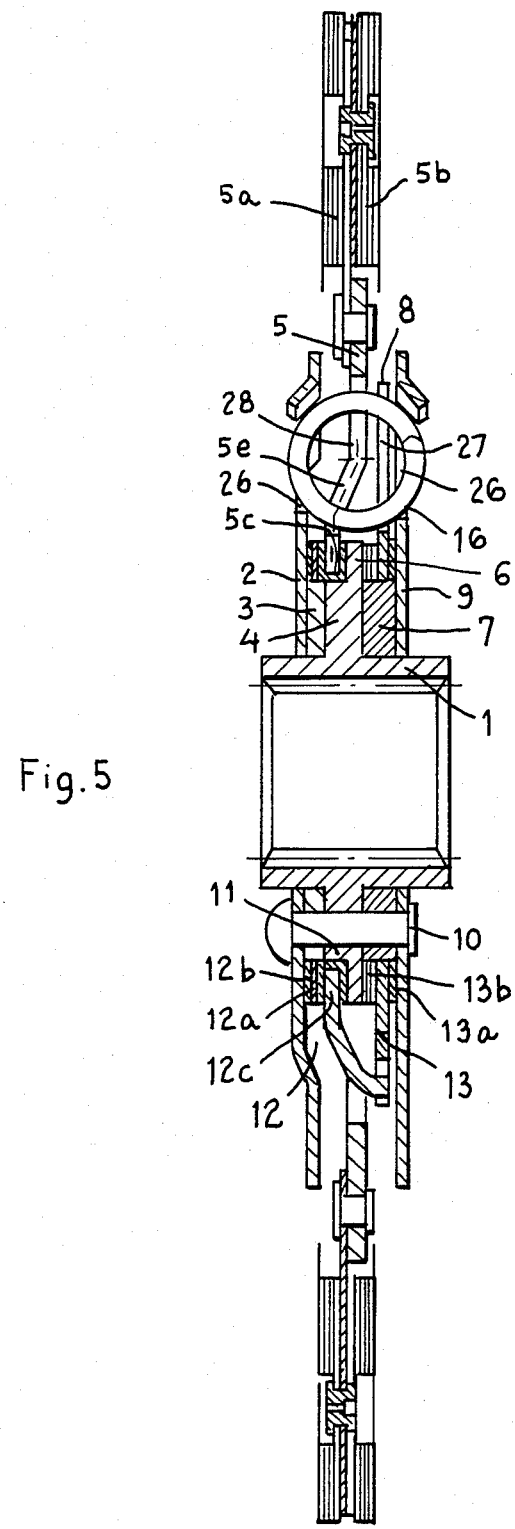
FIG. 5 is a sectional view similar to that of FIG. 2 but showing a partition which is integral with the flange of the hub.

Referring to FIGS. 1 and 2, there is shown a clutch disc arrangement which comprises a first component including a hub 1 carrying, as seen in a direction from the left to the right in FIG. 2, a first lateral disc-shaped washer-like guide 2, a washer-like distancing ring or carrier 3, a ring-shaped mounting flange 4 for a clutch disc 5, a ring-shaped partition 6, a ring-shaped carrier or distancing ring 7 surrounded by a load friction disc 8, and a second lateral disc-shaped guide 9. The parts 1, 2, 3, 4, 6, 7 and 9 which constitute the first component are held together against rotation with reference to each other by an annulus of rivets 10 or analogous fasteners.

The clutch disc 5 forms part of a second component and carries the customary friction coatings 5a and 5b one of which can be engaged by the flywheel on the crankshaft of an engine and the other of which can be engaged by the pressure plate of a friction clutch when the clutch disc arrangement of the present invention is used as a constituent of a clutch in an automotive vehicle. Furthermore the clutch disc 5 has a centrally located opening 5c which receives a portion of a sleeve 11 forming part of a first friction generating device and having a substantially L-shaped cross-sectional outline (refer to FIG. 3). The sleeve 11 comprises a first or base portion 11a which is received in the opening 5c and preferably consists of steel and a second portion or coating 11b. The portions 11a and 11b of the sleeve 11 are shown only in FIG. 3 because the scale of FIG. 2 is too small for adequate illustration of such parts. One leg of the portion 11b is adjacent to the peripheral surface of the carrier 3 and/or flange 4, and the other leg of this portion is adjacent to the partition 6. The sleeve 11 is slotted, not unlike a piston ring, so that it can be inserted into the opening 5c of the clutch disc 5.

A second part 12 of the first friction generating device is installed between the guide 2 and the clutch disc 5. This part 12 comprises a dished spring 12a, a supporting disc 12b which is biased by the spring 12a, and a friction pad 12c which is biased by the disc 12b. The spring 12a furnishes the axially oriented force which is needed to generate the braking moment during the initial damping stage.

The carrier or distancing ring 7 is surrounded by the friction disc 8 as well as by a second friction generating device 13 which latter comprises a dished spring 13a at one side of the disc 8 and a friction pad 13b at the other side of the disc 8.

In the path for transmission of torque between the hub 1 and the friction coatings 5a, 5b, there are provided four groups of energy storing devices in the form of coil springs 14, 15, 16 and 17. The coil spring 14 is installed in a window 18 of the clutch disc 5 and in identically dimensioned windows 19 of the guides 2, 9 and is effective independently of the coil springs 15, 16, 17 within a range including the angles 20 and 21 extending to the opposite sides of a neutral angular position of the clutch disc 5. When the clutch disc 5 turns relative to the hub 1 through the angle 20 or 21, the torque varies in a manner as indicated in the central part of the diagram of FIG. 4.

Once the angular displacement of the clutch disc 5 relative to the hub 1 exceeds the angle 20 or 21, a portion of the surface surrounding a window 22 in the clutch disc 5 strikes against the spring 15 which is installed in the windows 23 of the guides 2 and 9. The spring 15 is thereby caused to store energy while the clutch disc 5 turns beyond the angle 20 or 21 through the angle 24 or 25. At such time, the portion 12 of the first friction generating device cooperates with the spring 15 by resisting rotation of the clutch disc 5 relative to the hub 1.

The two coil springs 16 are installed in the windows 26 of the guides 2, 9 and in identically dimensioned windows or cutouts 27 of the friction disc 8. The clutch disc 5 is further formed with windows 28 for the springs 16, and the dimensions of the windows 28 exceed those of the windows 26 and 27 (as considered in the circumferential direction of the hub 1) by distances corresponding to the angles 24 and 25.

The clutch disc 5 has arms or projections 5d which are received in cutouts or windows 29 of the friction disc 8 with a certain amount of clearance, as considered in the circumferential direction of the hub 1. The clearance corresponds to the aforediscussed angles 24 and 25. Once the clutch disc 5 turns beyond the angle 24 or 25 (relative to the hub 1 and relative to the friction disc 8), the arms 5d strike against the surfaces bounding the respective cutouts 29 and cause the friction disc 8 to share the angular movement of the clutch disc 5. Such joint angular displacement of the discs 5 and 8 takes place against the opposition of the springs 16 and also against the opposition of the second friction generating device 13. The angles through which the discs 5 and 8 turn in unison against the opposition of the springs 16 and friction generating device 13 equal 30 minus 24 or 31 minus 25. The springs 16 are engaged by the surfaces bounding the windows 28 in the clutch disc 5 when the arms 5d strike against the surfaces surrounding the respective cutouts 29.

Once the discs 5 and 8 turn in unison beyond the angle 30 or 31, the surfaces surrounding the windows 32 of the clutch disc 5 engage the coil springs 17 which are mounted in the windows 33 of the guides 2 and 9 so that the springs 17 also contribute to a braking or damping action upon the discs 5 and 8. This takes place until the discs 5 and 8 turn through an angle 34 or 35 (note FIG. 4), namely, when the springs 17 and/or 16 cease to yield any longer because their convolutions actually touch one another so that each of the springs 17 and/or 16 constitutes a solid block which transmits torque between the hub 1 and the clutch disc 5 (friction coatings 5a and 5b) without any yielding. The friction disc 8 rotates with the clutch disc 5 while the latter turns beyond the angle 30 or 31, i.e., through the angle 34 or 35; therefore, the second friction generating device 13 is effective at such time in addition to the portion 12 of the first friction generating device. By properly selecting the liner 11b of the sleeve 11, one can influence friction during angular displacement of the clutch disc 5 through the angle 24 or 25, i.e., one can influence the friction which is generated by the portion 12 of the first friction generating device during the initial stage of the damping action.

The clutch disc 5 has a dished radially innermost portion 5e which overlies the sleeve 11 and the partition 6.

An advantage of the partition 6 between the discs 5 and 8 is that it renders it possible to employ a single friction disc and also that such partition allows for highly accurate and predictable selection of the action of the two friction generating devices. This is due to the fact that the friction generating device 11, 12 is structurally and functionally separated from the friction generating device 13, i.e., any influencing of the friction generating device 11, 12 (which is active at least during the initial stage or stages of rotation of the clutch disc 5 from its neutral angular position) does not affect the operation of the friction generating device 13, and vice versa. As mentioned above, the radial dimensions of the partition 6 are preferably small, i.e., this partition is preferably located radially inwardly of the springs 14, 15 and 17 which operate between the clutch disc 5 and the first component including the parts 1, 2, 3, 4, 6, 7 and 9. Furthermore, the maximum diameter of the partition 6 is preferably less than the maximum diameter of the friction disc 8 and/or guides 2, 9 and preferably only a small fraction of the maximum diameter of the second component including the clutch disc 5 and its friction coatings 5a, 5b.

Whether the partition 6 is an integral part of the hub 1 or is a separately machined ring or washer which is riveted to the flange 4 depends on the manufacturing preferences and/or other factors. The same applies for the carriers or distancing rings 3 and 7, i.e., at least one of these carriers can be made integral with the hub 1. Each of the carriers 3, 7 can consist of a package of two or more rings. An advantage of separately manufactured carriers is that they can be mass-produced at a low cost from sheet metal by resorting to a stamping or analogous technique.

It is further within the purview of the invention to provide the arms 5d or analogous projections on the friction disc 8 and to then provide the cutouts 29 in the clutch disc 5. Still further, it is possible to provide each of the discs 5, 8 with one or more projections as well as with one or more cutouts. The width of the cutouts 29, and more particularly the difference between the width of such cutouts and the width of the corresponding projections (as considered in the circumferential direction of the hub 1) will determine the extent of angular movement of the clutch disc 5 relative to the hub 1 before the clutch disc 5 entrains the friction disc 8, i.e., before the load friction unit including the disc 8, the friction generating device 13 and the springs 16 between the friction disc 5 and the first component (1, 2, 3, 4, 6, 7, 9) of the clutch disc arrangement becomes effective during an advanced stage of rotation of the clutch disc 5 relative to the hub 1.

An advantage of the feature that the radially innermost portion 5e of the clutch disc 5 constitutes or resembles a dish is that the portion 5e can at least partially surround the flange 4 of the hub 1 as well as the friction generating device 11, 12 and/or 13. This renders it possible to reduce the dimensions of the clutch disc 5, as considered in the axial direction of the hub 1, as well as to dispose the coil springs 14 to 17 substantially midway between the maximum and minimum diameters of the clutch disc 5.

The provision of the aforediscussed sleeve 11 in the form of a laminated split ring including the portions 11a and 11b exhibits the advantage that the clutch disc 5 is adequately guided by the flange 4 as well as by the partition 6, and that the magnitude of frictional forces between the clutch disc 5 and the neighboring parts is uniform. This, in turn, contributes to longer useful life of the clutch disc 5 and of the entire clutch disc arrangement. The making of the portion 11a of steel and in the form of a split ring facilitates the assembly of the clutch disc arrangement, it allows for compensation of manufacturing tolerances, and it also contributes to longer useful life of the sleeve 11.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A clutch disc arrangement for use in friction clutches, particularly in friction clutches of automotive vehicles, comprising a first component including a hub, a pair of spaced apart guides rotatable with said hub and a partition rigid with said hub; a second component including a clutch disc disposed between said guides and rotatable within limits relative to said first component from a neutral position; first energy storing means interposed between said components to yieldably resist rotation of said clutch disc from said neutral position; at least one first friction generating means interposed between said components to resist at least some first stages of rotation of said clutch disc from said neutral position; and a load friction unit interposed between said components to resist predetermined advanced stages of rotation of said clutch disc from said neutral position and to resist at least one of said first stages jointly with said first friction generating means, said load friction unit including at least one friction disc between said clutch disc and one of said guides, at least one second friction generating means interposed between said friction disc and first component, and second energy storing means disposed outwardly of said partition, as considered in the radial direction of said hub, and interposed between said friction disc and at least one of said guides to yieldably oppose rotation of said clutch disc relative to said first component during a predetermined stage of rotation of said clutch disc from said neutral position, said clutch disc and said first friction generating means being disposed at one side and said friction disc and said second friction generating means being disposed at the other side of said partition, as considered in the axial direction of said hub.

2. The arrangement of claim 1, wherein each of said discs constitutes an annulus, said first component further comprising a first carrier surrounded by said clutch disc and a second carrier surrounded by said friction disc.

3. The arrangement of claim 2, wherein said carriers are disposed between said guides.

4. The arrangement of claim 2, wherein said hub comprises a radially outwardly extending flange which is surrounded by said clutch disc.

5. The arrangement of claim 2, wherein said first friction generating means surrounds said first carrier and said second friction generating means surrounds said second carrier.

6. The arrangement of claim 2, wherein at least one of said carriers comprises a ring surrounding said hub and being rotatable therewith.

7. The arrangement of claim 1, wherein said first component comprises an annular carrier and said clutch disc is an annulus surrounding said carrier, said first friction generating means comprising a first portion adjacent to said clutch disc and a second portion interposed between said first portion and said carrier.

8. The arrangement of claim 7, wherein said carrier is a ring-shaped distancing member and said clutch disc has a central opening for said distancing member and said portions of said first friction generating means.

9. The arrangement of claim 8, wherein each of said portions of said first friction generating means comprises a substantially ring-shaped element having a substantially L-shaped cross-sectional outline.

10. The arrangement of claim 9, wherein each of said portions has a first leg disposed between said clutch disc and said distancing member and a second leg disposed between said clutch disc and said partition.

11. The arrangement of claim 7, wherein said first portion consists of steel and said second portion consists of material having a relatively high coefficient of friction and constituting a liner for said first portion.

12. The arrangement of claim 7, wherein said portions of said first friction generating means are split rings.

13. The arrangement of claim 1, wherein one of said discs includes at least one projection engageable with the other of said discs in response to rotation of said clutch disc relative to said first component.

14. The arrangement of claim 13, wherein said other disc has a cutout for said projection.

15. The arrangement of claim 14, wherein said projection is integral with said one disc.

16. The arrangement of claim 14, wherein said projection is received in said cutout with at least some clearance, as considered in the circumferential direction of said hub, so that said clutch disc has limited freedom of angular movement relative to said friction disc, said load friction unit being ineffective while said clutch disc if free to turn relative to said friction disc.

17. The arrangement of claim 13, wherein said projection is provided on said clutch disc.

18. The arrangement of claim 1, wherein said partition comprises a washer which is non-rotatably secured to said hub.

19. The arrangement of claim 18, wherein said hub includes a radially outwardly extending flange and said partition is secured to said flange.

20. The arrangement of claim 1, wherein at least one of said discs comprises at least one projection extending in the axial direction of said hub toward the other of said discs and overlying one of said friction generating means.

21. The arrangement of claim 20, wherein said projection overlies said partition.

22. The arrangement of claim 1, wherein said partition and said guides are non-rotatably secured to said hub said clutch disc surrounds said hub between one of said guides and said partition, said friction disc surrounding said hub between said partition and the other of said guides.

23. The arrangement of claim 22, wherein said first friction generating means is disposed between said partition and said one guide, said second friction generating means being disposed between said partition and said other guide.

24. The arrangement of claim 1, wherein said guides are rigid with said hub, said clutch disc being rotatable from said neutral position in clockwise and counterclockwise directions.

25. The arrangement of claim 1, wherein said partition includes an annular member whose maximum diameter is a small fraction of the maximum diameter of said second component and less than the maximum diameters of said guides and said friction disc.

26. The arrangement of claim 1, wherein said partition is integral with said hub.

27. The arrangement of claim 1, wherein said clutch disc is an annulus having a dished inner marginal portion.

* * * * *